April 25, 1939.  N. J. MILLER  2,155,730

BELLY SKINNING MACHINE

Filed Nov. 16, 1936  3 Sheets-Sheet 1

Nick John Miller
INVENTOR

ATTEST —

BY
ATTORNEY

April 25, 1939.  N. J. MILLER  2,155,730
BELLY SKINNING MACHINE
Filed Nov. 16, 1936    3 Sheets-Sheet 2

Nick John Miller
INVENTOR

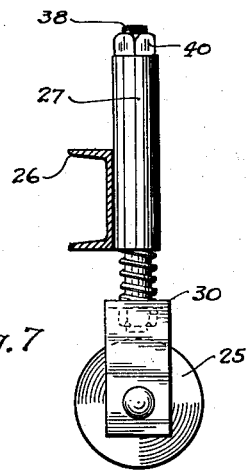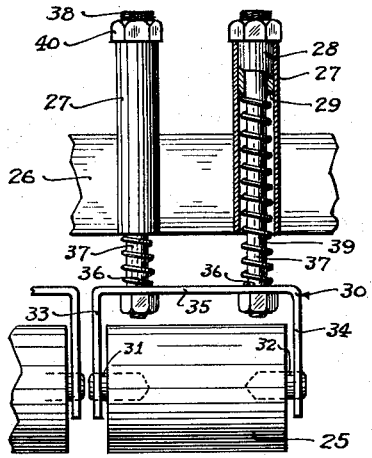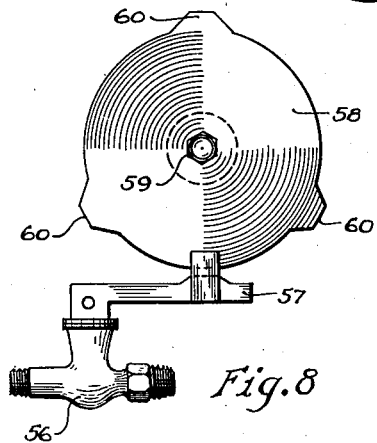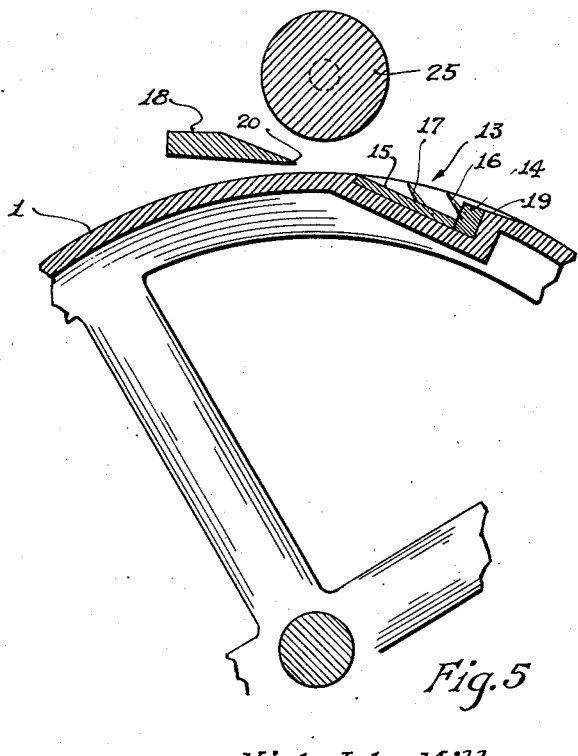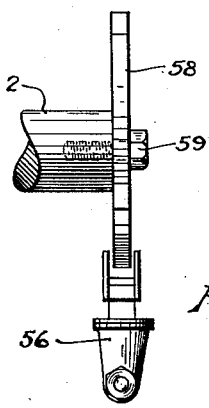

Patented Apr. 25, 1939

2,155,730

UNITED STATES PATENT OFFICE 2,155,730

BELLY SKINNING MACHINE

Nick John Miller, St. Paul, Minn., assignor to Industrial Patents Corporation, Chicago, Ill., a corporation of Delaware Application November 16, 1936, Serial No. 111,161

10 Claims. (Cl. 146—130)

This invention relates to an improved device for removing skins from pork bellies.

One of the objects of the invention is to provide an improved belly skinning machine.

Another object of the invention is to provide an improved presser means for flattening the irregular skin surface of a pork belly at the moment of being moved relative to a skinning knife.

Another object of the invention is to provide an improved means for removing the severed skins from the machine.

Other objects of the invention will be apparent from the description and claims which follow.

In the practice of conventional packing house methods, the skin and brisket surfaces of pork bellies, by reason of curing and smoking, become curled and irregular. It is the purpose of belly skinning machines to remove the skin with a minimum loss of the brisket. To accomplish this, it is important that the width of the skin side of the belly be completely flattened at the moment of cutting to permit setting of the knife blade within the narrowest possible limits relative to the skin thickness.

Heretofore, there has been utilized, in machines of this character, means usually comprising a single roller extending the width of the belly for pressing the belly against a movable surface while being carried relative to a skinning knife. Rollers of this type, however, serve only to press against the high points of the curled surfaces of the cured and smoked bellies and for this reason are found unsuitable for obtaining the best result.

In accordance with the present invention, a series of independent, longitudinally arranged, spring-tensioned presser rollers serve to uniformly press the width of the belly against a rigid movable surface immediately approaching a fixed knife blade. This uniform pressure of the independently spring-tensioned rollers causes a complete flattening of the skin side against the rigid surface and thus enables setting of the knife blade within the narrowest possible limits according to the thickness of the skin by which the skin may be removed without cutting away portions of the brisket.

In the device of the present invention, the skins, after severance, are removed from the machine by means of an intermittent air blast controlled relative to the movement of the movable surface.

Reference is now had to the drawings in which like numerals are used to designate similar elements.

Figure 5 is an enlarged fragmentary view, partly in section, illustrating the relative positioning of the drum, the presser rollers and the knife blade.

Figure 6 is an enlarged detailed view, partly in section, of one of the presser rollers.

Figure 7 is an end view of Figure 6.

Figure 8 is a side view of the cam and valve mechanism for intermittently controlling the air outlet for removing the severed skins from the machine.

Figure 9 is an end view of Figure 8.

Figure 1:
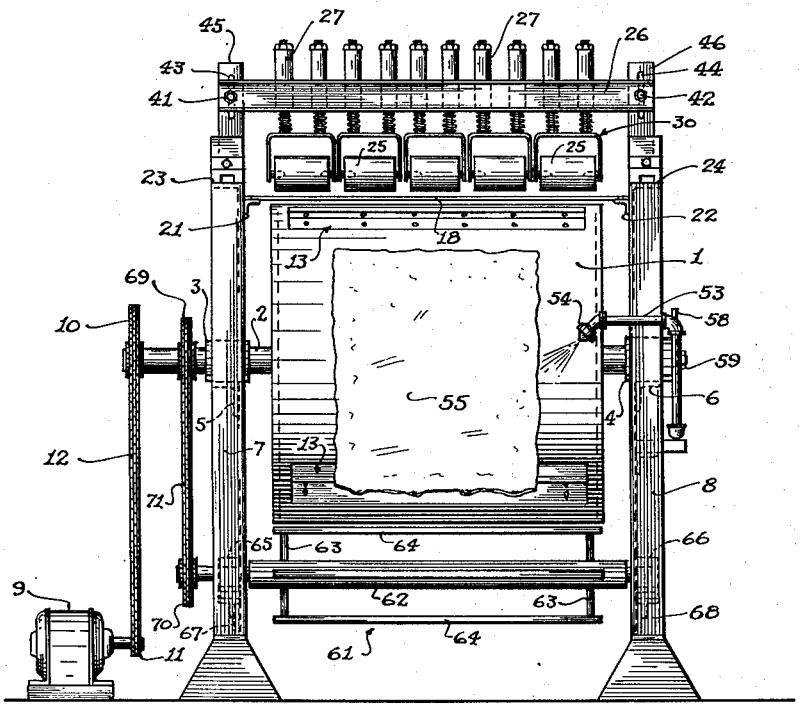
Figure 1 is an end view of the belly skinning device constructed in accordance with the present invention.
Figure 2:
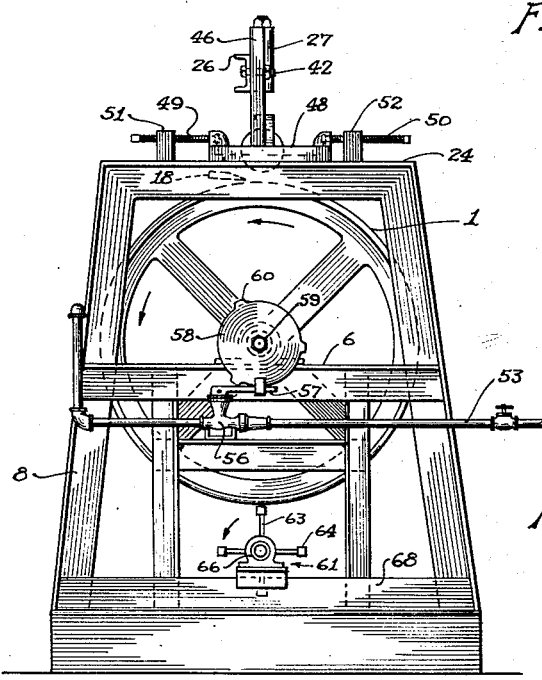
Figure 2 is a side view of Figure 1.
Figure 3:
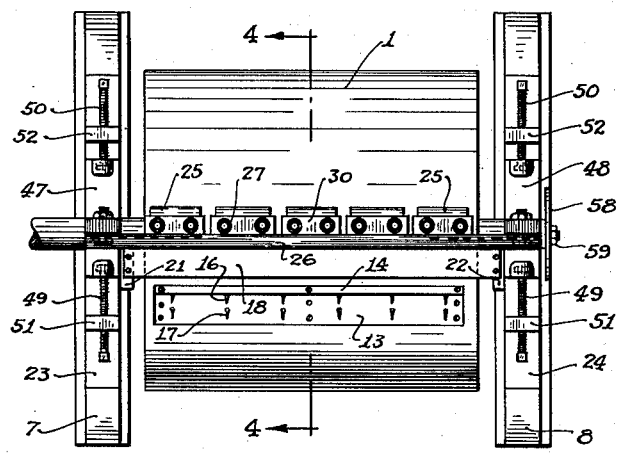
Figure 3 is a plan view of Figure 1.

In the embodiment of the invention illustrated in the drawings, drum 1 is pinioned or otherwise secured to drive shaft 2 journaled in bearings 3 and 4, respectively mounted on cross members 5 and 6 of standards 7 and 8. As viewed in Figure 4, shaft 2 is rotatably driven in a counter-clockwise direction by power transmitted from motor 9 through the medium of gears 10 and 11 and chain 12.

The peripheral surface of drum 1 is provided with a series of spaced, longitudinal recesses 13 for rigidly mounting bars 14 and 15 respectively provided with grab pins 16 and 17 for securing pork bellies to the drum surface for carriage against fixed knife blade 18.

The surface of drum 1 is milled off at the rear side of each of the recesses 13 to provide tapered recesses 19 to compensate for the difference in thickness of the skin found at the back portion of the bellies.

The cutting edge 20 of knife blade 18 is mounted to extend longitudinally of and in spaced relation with the peripheral surface of drum 1. The space between cutting edge 20 and the surface of drum 1 is fixed at the narrowest possible limit to allow complete removal of a completely flattened skin without cutting away portions of the brisket. Knife blade 18 may be fixedly secured in the machine, as by brackets 21 and 22, bolted or otherwise secured to cross members 23 and 24 of standards 7 and 8.

In accordance with the present invention, the width of the bellies, immediately approaching knife blade 18, is uniformly pressed against the rigid surface of drum 1 by independently spring-tensioned presser rollers 25 longitudinally arranged in series parallel to the surface of drum 1. The provision of such a series of rollers provides a uniform pressure across the entire width of the bellies, notwithstanding their irregular brisket and skin surfaces and thus assures complete flattening of the skin surfaces against the surface of drum 1 to cooperate with the fixed setting of knife blade 18. In practice, a series of five rollers has been found satisfactory.

The series of rollers 25 are each slidably connected with a common yoke 26 in a manner to permit their independent movement from and toward the surface of drum 1. The means for connecting rollers 25 with yoke 26 comprises a series of parallel, vertically arranged cylinders 27 welded or otherwise secured to yoke 26 and provided at their upward ends with bushings 28 fitted against the inner surfaces thereof to provide shoulders 29. Cylinders 27 may number two or more for each of the rollers 25.

The rollers 25 are each rotatably carried on a U-shaped bracket 30, as by bearing pins 31 and 32, respectively mounted in the side arms 33 and 34 of the bracket 30. The cross arm 35 of each of the brackets 30 is provided with suitable openings 36 in which are provided upwardly extending rod members 37 in spaced relation with their respective cylinders 27.

A coiled spring 39 is provided on each of the rod members 37 and the rod members of each roller are passed through their respective cylinders 27 and are slidably secured within the cylinders 27, as by nuts 40 threaded on the ends 38 thereof. Thus, it will be seen that each of the coiled springs 39 will abut its respective shoulder 29 and the cross arm 35 of bracket 30 and tend to slidably urge the rollers 25 in a downwardly direction toward the surface of drum 1.

Yoke 26 may be secured at either of its ends, as by bolts 41 and 42 in slots 43 and 44 in uprights 45 and 46 respectively mounted on bearing blocks 47 and 48. The slots 43 and 44 provide adjustment of rollers 25 as a unit relative to the surface of drum 1.

Bearing blocks 47 and 48 are each adjustably connected with cross members 23 and 24 through the medium of adjusting bolts 49 and 50 pivotally secured to the ends of bearing blocks 47 and 48 and threaded in fixed blocks 51 and 52 rigidly secured to cross members 23 and 24. The adjustment of bearing blocks 47 and 48 permits movement of yoke 26 and thus rollers 25 transversely of drum 1 for obtaining the desired position for applying pressure of rollers 25 against the bellies in advance of knife blade 18.

Figure 4:
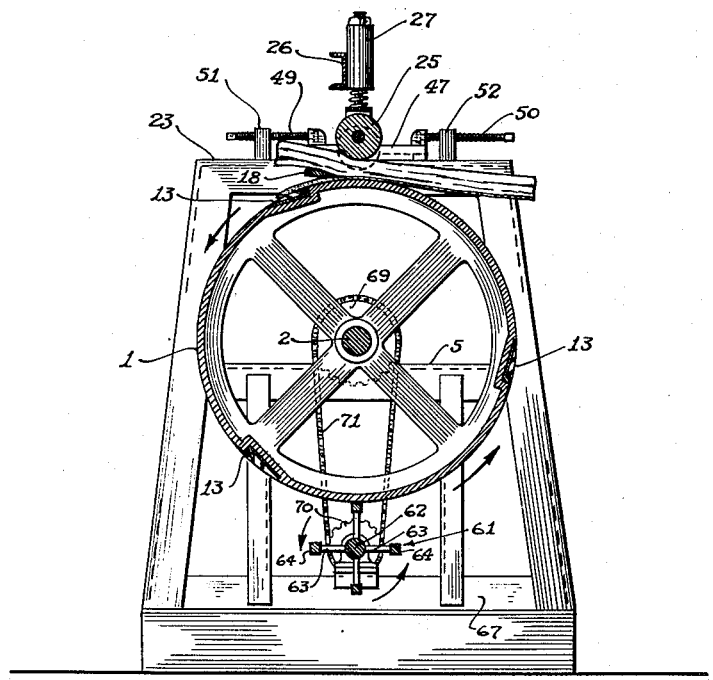
Figure 4 is a view, partly in section, taken on line 4—4 of Figure 3.

In Figure 4, a belly is shown being carried on drum 1, beneath rollers 25 and against knife blade 18. In this figure, rollers 25 are shown in full lines in pressing position against the belly and in broken lines in the position they assume when not in operation.

The severed skins are carried on drum 1 past knife blade 18 and are removed from the surface of drum 1 by air pressure issuing from line 53. Line 53 extends from a compressor not shown, and at its outlet end 54 is arranged to direct air at an angle against the outer surface of drum 1 and beneath the severed skin 55, as shown in Figure 1.

The air released from line 53 is intermittently controlled through the medium of valve 56 provided with spring-tensioned plunger lever 57 in operative engagement with cam 58. Cam 58 may be secured at the end of drive shaft 2, as by bolt 59, and is provided with a series of high points 60 arranged in spaced relationship with recesses 13 for operating valve 56 in timed relation with the movement of the severed skins on the surface of drum 1. If desired, an air line similar to line 53 may be positioned at opposite edges of drum 1. In practice, however, the use of a single air line has been found satisfactory.

Skins blasted from the surface of drum 1 in the manner above described, usually fold over and away from the drum surface and fall by gravity from grab pins 16 and 17. In the event, however, an occasional skin fails to release from the grab pins 16 and 17, it is mechanically pulled from the grab pins before return of the grab pins to the belly-receiving position by reel 61 rotatably mounted in close relationship with the surface of drum 1.

Reel 61 comprises a shaft 62 provided with a series of spaced, radially extending arms 63 to which are secured beater rods 64. Shaft 62 is journaled within bearings 65 and 66 mounted on cross members 67 and 68 of standards 7 and 8. Shaft 62 extends longitudinally of the drum surface and is suitably spaced therefrom so that beater rods 64 will sufficiently engage the passing skin to remove it from the grab pins 16 and 17 without tearing. Shaft 62 may be rotatably driven by power transmitted from drive shaft 2 through the medium of sprockets 69 and 70 and chain 71.

The invention is not to be limited by the disclosure herein given which is merely by way of illustration. The scope of the invention may be determined from the appended claims.

I claim:

1. In a belly skinning machine including a frame, a drum providing a rigid surface rotatably mounted in the frame, a knife blade in fixed spaced relationship with the drum surface and means for securing bellies to the drum surface for carriage against the knife blade, a series of spring-tensioned presser rollers are ranged longitudinally of the drum surface and adapted for independent movement from and toward the drum surface and means connecting each of the rollers with the frame including a pair of parallel cylinders connected with the frame, a pair of rods connected with each of the rollers and adapted for slidable movement in the cylinders and a spring member on each of the rods for urging the rollers toward the drum surface.

2. In a belly skinning machine including a frame, a drum providing a rigid surface rotatably mounted in the frame, a knife blade in fixed spaced relationship with the drum surface and means for securing bellies to the drum surface for carriage against the knife blade, a series of spring-tensioned presser rollers arranged longitudinally of the drum surface and adapted for independent movement from and toward the drum surface and means connecting each of the rollers with the frame including a series of spaced parallel cylinders provided with spring abutments connected with the frame, a plurality of rods connected with each of the rollers and adapted for slidable movement within the cylinders and a spring member provided on each of the rods and movable against the abutments for urging the rollers in a direction toward the drum surface.

3. In a belly skinning machine including a frame, a drum providing a rigid surface rotatably mounted in the frame, a knife blade in fixed spaced relationship with the drum surface and means for securing bellies to the drum surface for carriage against the knife blade, a series of spring-tensioned presser rollers arranged longitudinally of the drum surface and adapted for independent movement from and toward the drum surface and means mounting the rollers as a unit comprising a yoke connected with the frame, a series of spaced parallel cylinders provided with spring abutments secured to the yoke, roller carrying brackets, rods extending from each of the brackets, means securing the rods of each bracket within their respective cylinders and a spring member provided on each of the rods between its respective bracket and cylinder spring abutment.

4. In a belly skinning machine including a frame, a drum providing a rigid surface rotatably mounted in the frame, a knife blade in fixed spaced relationship with the drum surface and means for securing bellies to the drum surface for carriage against the knife blade, a series of spring-tensioned presser rollers arranged longitudinally of the drum surface and adapted for independent movement from and toward the drum surface and means mounting the rollers as a unit comprising a yoke, adjustably connected with the frame, a series of spaced parallel cylinders provided with spring abutments secured to the yoke, roller carrying brackets, rods extending from each of the brackets, means securing the rods of each bracket within their respective cylinders and a spring member provided on each of the rods between its respective bracket and cylinder spring abutment, the yoke being adapted for movement from and toward the drum surface for adjustably positioning the rollers as a unit relative to the drum surface.

5. In a belly skinning machine including a frame, a drum providing a rigid surface rotatably mounted in the frame, a knife blade in fixed spaced relationship with the drum surface and means for securing bellies to the drum surface for carriage against the knife blade, a series of spring-tensioned presser rollers arranged longitudinally of the drum surface and adapted for independent movement from and toward the drum surface and means mounting the rollers as a unit comprising a yoke adjustably connected with the frame, a series of spaced parallel cylinders provided with spring abutments secured to the yoke, roller carrying brackets, rods extending from each of the brackets, means securing the rods of each bracket within their respective cylinders and a spring member provided on each of the rods between its respective bracket and cylinder spring abutment, the yoke being adapted for movement transversely of the drum surface for positioning the rollers as a unit relative to the knife blade.

6. In a belly skinning machine including a rotatable drum providing a rigid surface, a knife blade in fixed spaced relationship with the drum surface and means including pins circumferentially spaced on the drum surface for securing bellies with their skin sides adjacent the drum surface for carriage against the knife blade, means comprising a reel rotatably mounted in close relationship with the drum surface for removing the severed skins from the drum securing pins comprising a shaft rotatably mounted in the frame in parallel relationship with the longitudinal drum surface, beater rods extending longitudinally of the drum surface and arms rigidly connecting the rods and the shaft, the reel being rotated in a direction counter to the direction of movement of the drum, the beater rods being rotated sufficiently close to the drum surface so as to engage and remove the severed skins from the drum securing pins and from the drum surface.

7. In a machine for skinning bellies having irregular skin and fat surfaces including a frame, a drum providing a rigid outer surface rotatably mounted in the frame, a knife blade mounted longitudinally of and in fixed spaced relationship with the outer drum surface and means for securing the skin surface of a belly adjacent the drum surface for carriage against the knife blade, a series of spring-tensioned presser rollers arranged in longitudinal alignment relative to the knife blade and to the drum surface, and means mounting each of the rollers in the frame including a plurality of parallel cylinders connected with the frame, a plurality of rods connected with each of the rollers and adapted for slidable movement in the cylinders and a spring member on each of the rods for urging the rollers toward the drum surface, the rollers each being adapted for independent movement from and toward the drum surface, the series of rollers being operable to press as a unit against the irregular fat surface of the belly to flatten the irregular skin surface of the belly against the drum surface at the line of movement of the belly against the knife blade.

8. In a machine for skinning bellies having a skin surface including a rotatable drum providing a rigid outer surface, a knife blade in fixed spaced relationship with the outer drum surface and means for securing a belly to the outer drum surface for carriage against the knife blade to sever the skin therefrom, the skin surface of the belly being secured adjacent the drum surface, means for removing the severed skin from the drum surface comprising a nozzle positioned to the outside of the outer drum surface and adapted to direct air under pressure at an angle against the drum surface and beneath the severed skin, and means for supplying compressed air to the nozzle.

9. In a machine for skinning bellies having a skin surface including a rotatable drum providing a rigid outer surface, a knife blade in fixed spaced relationship with the outer drum surface and means for securing a belly to the outer drum surface for carriage against the knife blade to sever the skin therefrom, the skin surface of the belly being secured adjacent the drum surface, means for removing the skin from the drum surface comprising a nozzle positioned to the outside of the outer drum surface and adapted to direct blasts of air at an angle against the drum surface and beneath the severed skin, an air line for supplying compressed air to the nozzle, and means operable to intermittently release the blasts of air from the nozzle in timed relation with the movement of the drum.

10. In a machine for skinning bellies having a skin surface including a rotatable drum providing a rigid outer surface, a knife blade in fixed spaced relationship with the outer drum surface and means for securing a belly to the outer drum surface for carriage against the knife blade to sever the skin therefrom, the skin surface of the belly being secured adjacent the drum surface, means for removing the severed skin from the drum surface comprising a nozzle positioned to the outside of the outer drum surface and adapted to direct blasts of air at an angle against the drum surface and beneath the severed skin, an air line for supplying compressed air to the nozzle, and means including a valve in the air line and a cam connected with the drum and with the valve to intermittently release the blasts of air from the nozzle in timed relation with the movement of the drum.

NICK JOHN MILLER.